Patented June 7, 1949

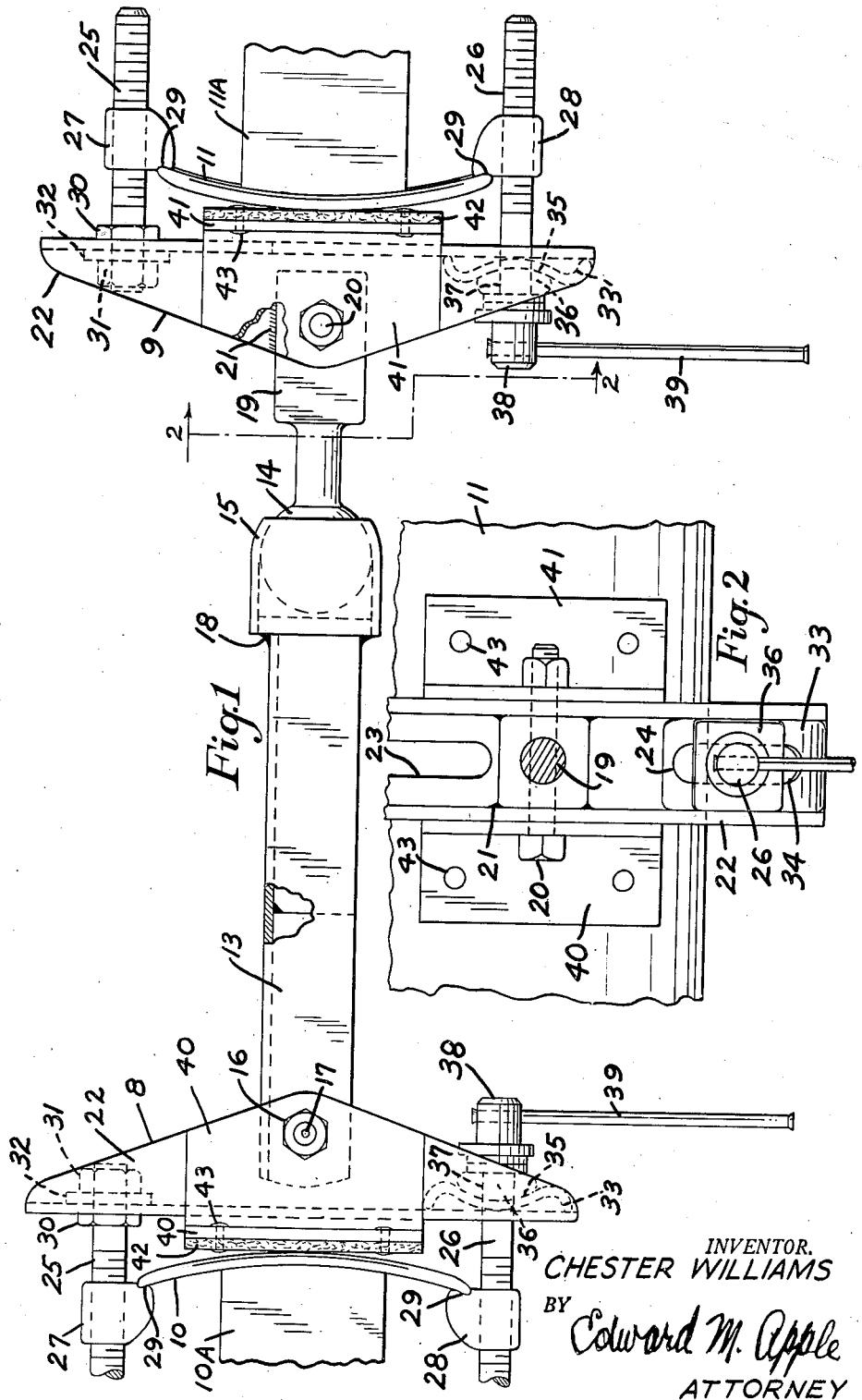

2,472,325

UNITED STATES PATENT OFFICE 2,472,325

TOW BAR

Chester Williams, Ypsilanti, Mich.

Application October 7, 1946, Serial No. 701,755

4 Claims. (Cl. 280—33.14)

This invention relates to automobile tow bars, and has particular reference to an automobile tow bar adapted to be attached to the rear bumper of a towing automobile and the front bumper of the automobile being towed.

An object of the invention is to generally improve devices of the character indicated, and to provide a device whereby one man can drive one automobile and tow another automobile behind the driven car.

Another object of the invention is to generally improve automobile tow bars, and to provide a device which is simple in construction, economical to manufacture and efficient in operation.

Another object of the invention is the provision of a device of the character indicated which has universal adaptability to any type of automobile bumper, and one which may be attached to, or removed from, an automobile bumper in a minimum of time.

Another object of the invention is the provision of a device of the character indicated which has freedom of action vertically without any strain on either the towing or the towed automobile bumper.

Another object of the invention is the provision of a device of the character indicated, which may be applied to the bumper of the towing automobile without danger of damaging the gravel shield or any other part of the vehicle.

The foregoing and other objects and advantages of the invention will become more apparent as the description proceeds, reference being made from time to time to the accompanying drawings forming part of the within disclosure, in which drawings:

Fig. 1 is a side elevational view of a device embodying my invention shown in towing position.

Fig. 2 is a section taken substantially on the line 2—2 of Fig. 1.

Referring now more particularly to the drawings, it will be understood that in the embodiment herein disclosed, my device consists of a pair of clamps 8 and 9, more particularly described hereinafter, adapted to respectively engage the bumpers 10 and 11 of a towed and towing automobile. The reference characters 10A and 11A indicate the bumper supports.

The clamps 8 and 9 are connected by a rectangular bar 13 and a ball and socket assembly 14 and 15. The bar 13 is secured to the body of the clamp 8 by a bolt 16 so that it is free to pivot in a vertical plane. An oil fitting 17 is provided to lubricate the pivotal connection.

The socket 15 is welded, as at 18, to the rectangular bar 13 and engages the ball 14 for universal movement. The ball 14 is secured to the end of an arm 19 which is bolted, as at 20, and welded, as at 21, to the clamp 9.

The clamps 8 and 9 are each formed of a channel shaped casting 22 which is provided with longitudinally positioned slots 23 and 24 which are adapted to accommodate the attaching bolts 25 and 26, each of which is provided with an internally threaded lug 27 and 28. The lugs 27 and 28 are provided with transverse grooves 29, which grooves are adapted to engage the opposite edges of the automobile bumpers 10 and 11.

The bolt 25 is secured in any desired position in the slot 23 (Fig. 2) by means of the nuts 30 and 31, and the washer 32. The slots 23 and 24 are provided so that the bolts 25 and 26 may be adjusted on the castings 22 to accommodate any width of bumper.

Secured by welding or other suitable means on the inside and near one end of each casting 22 is a saddle member 33, having a slot 34 (Fig. 2) in alignment with the slot 24. The saddle member 33 has an inwardly curved central portion 35 adapted to accommodate a rocker member 36, which is centrally bored, as at 37, to accommodate the bolt 26, so that the bolt 26 may be rocked into angular position with reference to the longitudinal axis of the casting 22. This structure is provided so that the lug 28 on the bolt 26 may be made to fit any type of bumper having either a straight or a curved cross section. The bolt 26 is provided with a terminal member 38, through which is slidably extended a bar 39, whereby the bolt 26 may be rotated to effect a clamping action between its lug 28 and the casting 22.

Secured to opposite sides of the castings 22 by welding or other suitable means are L-shaped angle plates 40 and 41 which serve to absorb the thrust placed upon the castings 22. Resilient pads 42 are secured to the backs of the L-shaped members 40 and 41 by means of rivets 43 or other suitable means so that the bumpers 10 and 11 will not be scratched or damaged.

When installing the tow bar, the clamp 9 carrying the ball and socket assembly 14 and 15 is secured to the bumper 11 of the towing automobile, and the clamp 8, which is pivoted to the end of the bar 13, is secured to the bumper 10 of the towed automobile. This arrangement is essential to the proper functioning of the tow bar for the reason that when making a turn the ball and socket assembly 14 and 15 relieves the rear bumper of the towing automobile of substantially all thrust, but exerts sufficient thrust on the front bumper of the towed car to cause the towed automobile to follow the towing automobile by reason of the caster, camber and tow in of the front wheels of the car being towed.

From the foregoing it will be seen that I have devised a simple bumper to bumper tow bar which is effective in operation, particularly for short hauls.

Having described my invention, what I claim and desire to secure by Letters Patent is:

1. A tow bar of the character described adapted for bumper to bumper attachment between a towing vehicle and a towed vehicle, comprising a comparatively long and a comparatively short section, a ball and socket joint between the said sections, the said short section having a clamp rigidly secured thereto, said clamp being arranged to be secured to the rear bumper of the towing vehicle and the long section having a clamp pivotally secured thereto, said last named clamp being arranged to be secured to the front bumper of the towed vehicle, each of said clamps consisting of a channel member having an outwardly extending thrust plate on each side thereof, said channel member having longitudinal slots therein adapted to accommodate attaching bolts, attaching bolts in said slots, and lugs on said bolts adapted to engage the edges of an automobile bumper.

2. In a device of the character described adapted for bumper to bumper attachment between a towing vehicle and a towed vehicle, the combination of a clamp adapted to engage the rear bumper of the towing vehicle, a bar secured for universal movement to said clamp, a second clamp being adapted to be secured to the front bumper of the towed vehicle and means for attaching said second clamp to said bar so that the said bar may be moved vertically with respect to said clamp, each of said clamps comprising a channel member having thrust plates on the back thereof adapted to engage the face of the vehicle bumper, slots in said channel members adapted to engage attaching bolts, attaching bolts in said slots, threaded lugs on said attaching bolts adapted to engage the edges of the vehicle bumper, one of said attaching bolts having a bore therein adapted to accommodate a slidable bar whereby said bolt may be rapidly threaded into its lug.

3. The combination defined in claim 2, in which each of said channel members is provided with a slotted arcuate member, said arcuate member having its slot in alignment with a slot of said channel member, and said arcuate member being adapted to cooperate with a rocker carried on one of said attaching bolts.

4. In a device of the character described including a towing and a towed vehicle having bumpers, the combination of a tow bar having double sections of unequal length, the longer of which sections is secured for limited movement to a clamp attached to the front bumper of the towed vehicle, the shorter of said sections being rigidly attached to a clamp secured to the rear bumper of the towing vehicle, there being a ball and a socket joint between said sections and positioned in closely spaced relation to the clamp which is secured to said rear bumper of the towing vehicle, each of said clamps comprising a member having aligned longitudinal slots, attaching bolts in said slots, one of said bolts having means associated therewith for holding it in various angular positions with reference to the longitudinal axis of said first named member, thrust plates extending outwardly from said first named member and adapted to contact one surface of the vehicle bumper, and threaded lugs on said bolts adapted to contact an opposite surface of said bumper, whereby upon rotation of said bolts said bumper is impinged between said thrust plates and said threaded lugs.

CHESTER WILLIAMS.

REFERENCES CITED

The following references are of record in the file of this patent:

UNITED STATES PATENTS

| Number | Name | Date |
| --- | --- | --- |
| 2,127,387 | Brattain | Aug. 16, 1938 |
| 2,162,100 | McGregor | June 13, 1939 |
| 2,231,592 | Porter | Feb. 11, 1941 |
| 2,243,347 | Klein et al. | May 27, 1941 |